(12) United States Patent  
Park

(10) Patent No.: US 10,116,849 B2  
(45) Date of Patent: Oct. 30, 2018

(54) LENS DRIVING ACTUATOR

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 12 days.

(21) Appl. No.: 15/378,967

(22) Filed: Dec. 14, 2016

(65) Prior Publication Data

US 2017/0090148 A1 Mar. 30, 2017

Related U.S. Application Data

(63) Continuation of application No. 14/650,476, filed as application No. PCT/KR2013/010961 on Nov. 29, 2013, now Pat. No. 9,554,023.

(30) Foreign Application Priority Data

Dec. 14, 2012 (KR) ........................ 10-2012-0145911

(51) Int. Cl.
*H04N 5/225* (2006.01)
*G02B 7/08* (2006.01)
(Continued)

(52) U.S. Cl.
CPC ............. *H04N 5/2257* (2013.01); *G02B 7/08* (2013.01); *G02B 27/646* (2013.01); *H04M 1/0264* (2013.01); *H04M 1/0277* (2013.01)

(58) Field of Classification Search
CPC ...... H04N 5/2257; G02B 27/646; G02B 7/08; H04M 1/0277; H04M 1/0264
See application file for complete search history.

(56) References Cited

U.S. PATENT DOCUMENTS

2008/0117535 A1 5/2008 Osaka et al.
2008/0186601 A1 8/2008 Honma
(Continued)

FOREIGN PATENT DOCUMENTS

CN 101551505 A 10/2009
CN 201532486 U 7/2010
(Continued)

OTHER PUBLICATIONS

International Search Report in International Application No. PCT/KR2013/010961, filed Nov. 29, 2013.
(Continued)

*Primary Examiner* — Shahbaz Nazrul
(74) *Attorney, Agent, or Firm* — Saliwanchik, Lloyd & Eisenschenk

(57) ABSTRACT

According to one embodiment of the present invention, a camera module includes: a movable element having first magnets which are formed at uniform intervals on the outer circumferential surface of a bobbin fixing a lens and second magnets which are arranged between the first magnets on the outer circumferential surface of the bobbin; a stator having first coil blocks which respectively face the first magnets, second magnets which respectively face the second magnets, and a housing which fixes the first coil blocks and the second magnets; an elastic member elastically supporting the movable element with respect to the stator; a base supporting the stator; and a case covering the housing and coupled to the base.

18 Claims, 3 Drawing Sheets

(51) Int. Cl.
    *G02B 27/64*    (2006.01)
    *H04M 1/02*     (2006.01)

(56) References Cited

U.S. PATENT DOCUMENTS

| | | |
|---|---|---|
| 2008/0297899 A1 | 12/2008 | Osaka et al. |
| 2011/0205646 A1 | 8/2011 | Sato et al. |
| 2011/0310500 A1 | 12/2011 | Osaka et al. |
| 2012/0200176 A1 | 8/2012 | Park |
| 2013/0215284 A1 | 8/2013 | Wade et al. |

FOREIGN PATENT DOCUMENTS

| | | |
|---|---|---|
| CN | 102043226 A | 5/2011 |
| CN | 102629815 A | 8/2012 |
| JP | 2010250045 A | 7/2006 |
| JP | 2008197313 A | 8/2008 |
| JP | 2011065140 A | 3/2011 |
| JP | 2011090064 A | 5/2011 |
| JP | 2012242801 A | 12/2012 |
| KR | 1020060084131 A | 7/2006 |

OTHER PUBLICATIONS

Office action dated Jun. 7, 2016 in U.S. Appl. No. 14/650,476.
Office Action dated Feb. 28, 2017 in Chinese Application No. 201380065673.9.

LENS DRIVING ACTUATOR

CROSS-REFERENCE TO RELATED APPLICATIONS

This application is the continuation of U.S. application Ser. No. 14/650,476, filed Jun. 8, 2015, which is the U.S. national stage application of International Patent Application No. PCT/KR2013/010961, filed Nov. 29, 2013, which claims priority to Korean Application No. 10-2012-0145911, filed Dec. 14, 2012, the disclosures of each of which are incorporated herein by reference in their entirety.

BACKGROUND

Field of the Disclosure

The present disclosure relates to a lens driving actuator configured to adjust a location of a lens with respect to an image sensor.

Discussion of the Related Art

Recently, mobile phones or smart phones, which are installed with a camera module configured to store an object as an image or motion picture, are being developed.

A conventional camera module includes a lens and an image sensor module configured to convert light passed through the lens to a digital image.

However, a high-quality digital image can hardly be obtained using the conventional camera module, because the conventional camera module lacks an auto-focusing function to automatically adjust an interval between the lens and the image sensor module. In addition, the conventional camera module suffers from a disadvantage in that the image quality degradation due to handshake may be cause by the user's handshakes.

BRIEF SUMMARY

According to an exemplary embodiment of the present disclosure, there is provided a camera module which performs a bi-directional focusing operation by floating an operator including a lens above a base, as well as performs a handshake compensation function during the auto-focusing operation.

Technical tasks of the present disclosure are not limited to the above-mentioned technical tasks. Other technical tasks which are not mentioned may be clearly understandable for persons who skilled in the art of the present disclosure from the following description.

In a general aspect of the present disclosure, there is provided a camera module, the camera module comprising: an operator including first magnets disposed at a bobbin for fixing a lens and second magnets respectively arranged between the first magnets; a stator including a housing having first coil blocks respectively facing the first magnets and second coil blocks respectively facing the second magnets; an elastic member configured to elastically support the operator with respect to the stator; a base configured to support the stator; and a case configured to cover the housing and coupled to the base.

According to an exemplary embodiment of the present disclosure, magnets for auto focusing and magnets for handshake compensation are alternately formed on an outer circumferential surface of the bobbin, and coil blocks disposed at positions responding to the magnets for auto focusing and the magnets for handshake compensation are arranged at the housing of the stator facing the bobbin.

Thereby, the auto-focusing operation and the handshake compensation operation may be independently performed, or the handshake compensation operation may be performed during the auto-focusing operation.

DETAILED DESCRIPTION

Hereinafter, exemplary embodiments of the present disclosure will be described in detail with reference to the accompanying drawings.

Unless defined otherwise herein, all technical and scientific terms used herein have the same meaning as commonly understood by one of ordinary skill in the art to which the present disclosure belongs. In a case when a term used herein conflicts with the customary meaning of the corresponding term, the meaning of the term defined herein shall supersede the customary meaning.

However, the inventions mentioned herein are used merely for description of a particular exemplary embodiment of the present disclosure. Thus, they are not intended to limit the scope of the present disclosure. Therefore, the definition of the terms shall be made based on the overall contents of the present disclosure. The same reference numbers are used throughout the present disclosure to refer to the identical elements of an exemplary embodiment.

Figure 1:
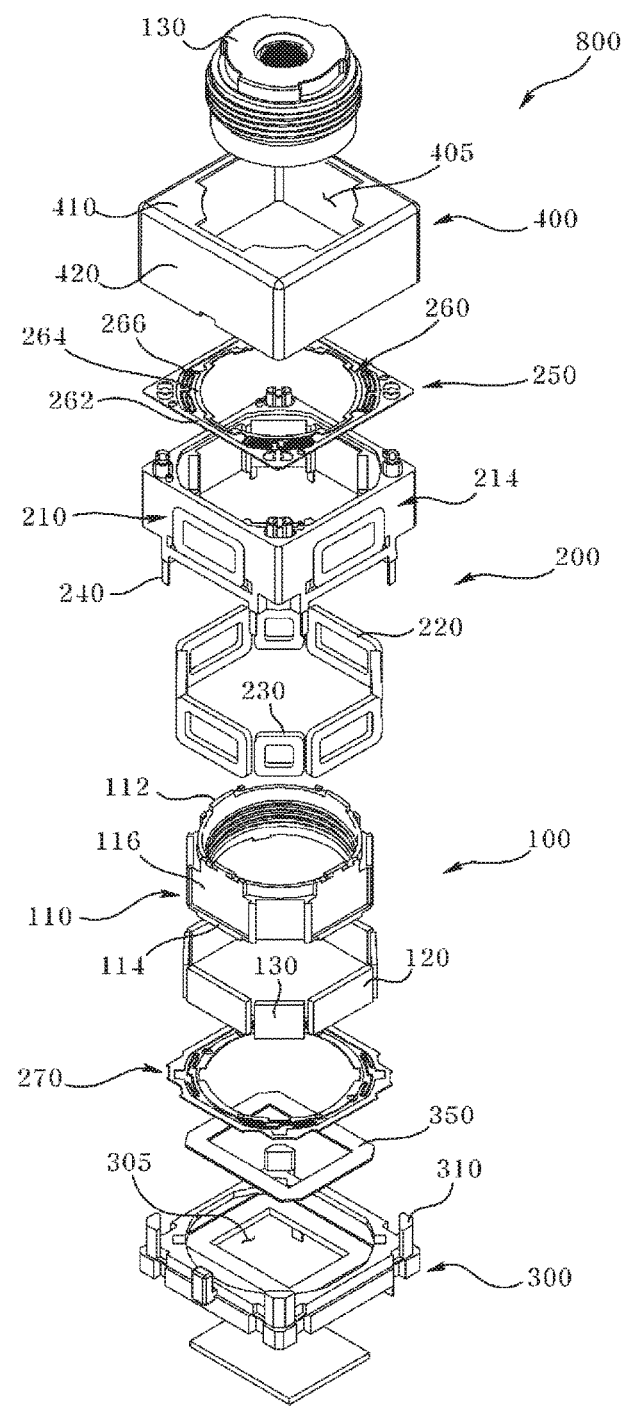
FIG. 1 is an exploded perspective view of a camera module according to an exemplary embodiment of the present disclosure.
Figure 2:
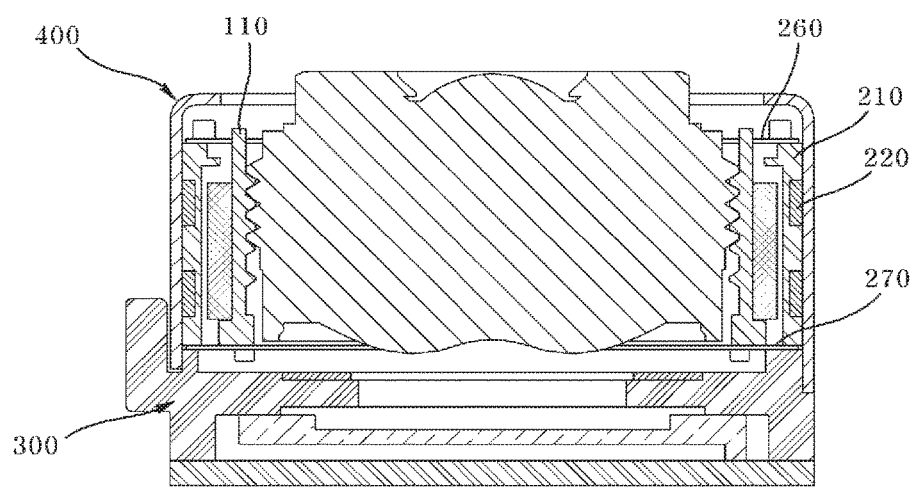
FIG. 2 is an assembly cross-sectional view of FIG. 1.

FIG. 1 is an exploded perspective view of a camera module according to an exemplary embodiment of the present disclosure; FIG. 2 is an assembly cross-sectional view of FIG. 1; and FIG. 3 is a selection perspective view illustrating a base, an operator, first coil blocks and second coil blocks of FIG. 1.

Figure 3:
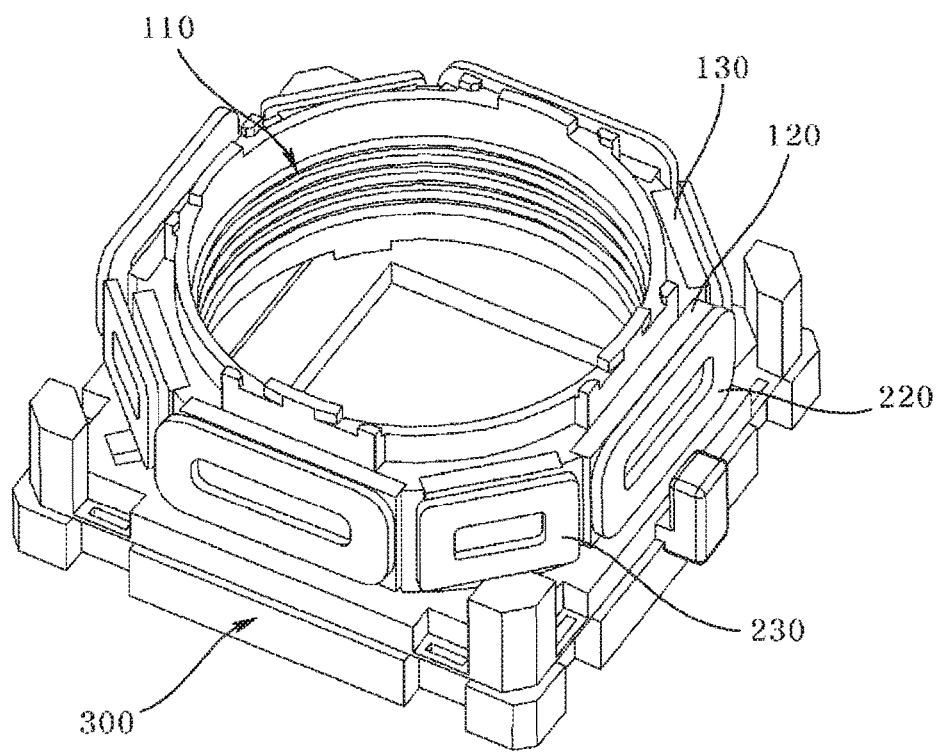
FIG. 3 is a selection perspective view illustrating a base, an operator, first coil blocks and second coil blocks of FIG. 1.

Referring FIGS. 1 to 3, an actuator (800) according to an exemplary embodiment of the present may perform an auto-focusing function as well as a handshake compensation function.

The auto-focus function is a function to drive an operator (100) from a stator (200). In order to perform such auto-focus function, the operator (100), which performs a focusing function by being installed with a lens, and the base (300) may be spaced from each other when a drive signal is not applied to the operator (100) and/or the stator (200).

The operator (100) may perform a particular focusing function while moving in a fist direction drifting apart from the base (300), according as a drive signal for lifting up the operator (100) (such as a forward direction current) is applied to the operator (100) floated above the base (300).

The operator (100) may perform a particular focusing function while moving in a second direction approaching to the base (300), according as a drive signal for dropping down the operator (100) (such as a backward direction current) is applied to the operator (100) floated above the base (300).

When moving the operator (100) bi-directionally by applying different drive signals to the operator (100) floated with respect to the base (300) on this wise, the consumed current amount may be reduced by reducing the current amount, thereby low power consumption characteristic may be implemented, as well as the time consumed in auto-focusing operation of the operator (100) by reducing drive distance of the operator (100).

In addition, magnets and coil blocks which perform handshake compensation function may be arranged at the stator (200) facing the operator (100). The magnets and the coil blocks may perform the handshake compensation function along with while the operator (100) is performing the auto-focus operation.

Hereinafter, a more detailed structure of the actuator (800) having auto-focusing function and handshake compensation function by such bi-directional operation will be described.

The actuator (800) may include an operator (100), a stator (200), an elastic member (250), a base (300) and a case (400).

The operator (100) may include a bobbin (110), first magnets (120) and second magnets (130). The first magnets (120) may be designed as to be used for implementing the auto-focus function. The second magnets (130) may be designed as to be used for implementing the handshake compensation function.

The operator (100) may perform the auto-focusing function while moving upward and downward at an upper portion of the based (300), as well as may perform the handshake compensation function while tilting at an upper portion of the based (300), by interactions with the stator (200) to be described hereinafter.

The bobbin (110) may be formed, for example, in a cylindrical shape. A female screw portion to be coupled to the lens (not illustrated in the drawings) may be formed on an inner circumferential surface of the bobbin (110). Such coupling between the bobbin (110) and the lens may be made using the female screw portion. Otherwise, the bobbin (110) and the lens may be coupled by a non-threaded coupling using such as an adhesive.

Coupling protrusions (112) to be respectively coupled to the elastic member (250) (to be described hereinafter) may be formed on the bobbin (110).

The outer circumferential surface of the bobbin (110) may be formed in a shape where curved sections and straight sections are alternately formed. Four straight sections and four curved section may be formed on the outer circumferential surface of the bobbin (110).

Support portions (114) protruded from the outer circumferential surface of the bobbin (110) may be formed on lower ends of the four straight sections formed on the outer circumferential surface of the bobbin (110). Recesses (114) concavely recessed from the outer circumferential surface of the bobbin (110) may be formed on the four straight sections formed on the outer circumferential surface of the bobbin (110). Here, the support portions (114) may be formed on upper ends of the outer circumferential surface of the bobbin (110).

The first magnets (120) may be respectively arranged at the four straight sections formed on the outer circumferential surface of the bobbin (110) and may be supported by the support portions (114). The first magnets (120) may be formed in a flat plate magnet. The first magnets (120) may be formed in a first size.

In addition, the first magnets (120) may adhere to the outer circumferential surface of the bobbin (110) using such as adhesive.

According to an exemplary embodiment of the present disclosure, the first magnets (120) may be formed on the outer circumferential surface of the bobbin (110) by a same interval. Four of the first magnets (120) may be arranged on the outer circumferential surface of the bobbin (110) by a 90 degree interval.

The second magnets (130) may be arranged at the recesses (116) formed on the curved sections of the bobbin (110). Therefore, the second magnets (130) may be arranged between the first magnets (120).

An even number of the second magnets (130) may be formed at a same interval between the first magnets (120). For example, the second magnets (130) may be respectively arranged between each of the first magnets (120). For example, four of the second magnets (130) may be formed.

The second magnets (130) may adhere to the recesses (116) formed on the outer circumferential surface of the bobbin (110) using such as adhesive.

According to an exemplary embodiment of the present disclosure, the second magnets (130) may be formed in a second size smaller than the first size of the first magnet (120). This is because the amount of magnetic force required to implement the auto-focusing function is larger than the amount of magnetic force required to implement the handshake compensation function, while the area of the outer circumferential surface of the bobbin (110) is restricted.

Of course, the second magnets (130) may be coupled to the straight sections and the first magnets (120) may be coupled to the curved sections, when the area of the four straight sections on the outer circumferential surface of the bobbin (110) is formed smaller than the area of the four curved sections.

The stator (200) may include a housing (210), a first coil block (220), a second coil block (230). In addition, the stator (200) may include a terminal pin (240).

The housing (210) may be formed, for example, in a shape of a square barrel of which bottom surface is opened. The housing (210) may be formed, for example, by an injection mold process using synthetic resin.

The operator (100) may be arranged in the housing (210). The housing (210) may cover the first magnets (120) and the second magnets (130) arranged on the outer circumferential surface of the bobbin (100) of the operator (100).

Four side walls (214) forming the housing (210) may be respectively formed in a plate shape. A recess for holding the first coil block (220) and the second coil block (230) may be formed on an outer side surface of an inner side surface of the side wall (214) of the housing (210). Although it is not illustrated in the drawings, a through-hole for holding the first coil block (220) and the second coil block (230) may be formed, instead of the recess.

The first coil block (220) may be arranged as facing each of the first magnets (120) disposed at the outer circumferential surface of the bobbin (110).

The first coil block (220) may be formed by winding a coil in a rectangular shape. The first coil block (220) may be formed in a same size as the first size of the first magnet (120).

Four of the first coil blocks (220) may be arranged by a same interval at the housing (210), as four of the first magnets (120) may be arranged by a same interval at the outer circumferential surface of the bobbin (110).

The auto-focus coil block (220) may generate electromagnetic force by a drive signal. The electromagnetic force generated by the first coil block (220) may interact with the first magnets (120) and drive the operator (100) in a direction drifting apart from the base (300), or in a direction approaching to the base (300), respectively.

According to an exemplary embodiment of the present disclosure, one of both sockets of the coil block (220) may be mutually and electrically connected.

The second coil block (230) may be coupled to the housing (210). The second coil block (230) may be arranged at a position responding to the second magnet (130) disposed at the outer circumferential surface of the bobbin (110)

The second coil block (230) may be formed by winding a coil in a rectangular shape. The second coil block (230) may be formed in a same size as the second size of the second magnet (130).

Four of the second coil blocks (230) may be arranged by a same interval at the housing (210), as four of the second magnets (130) may be arranged by a same interval at the outer circumferential surface of the bobbin (110).

One pair of the second coil blocks (230) arranged as facing each other may be applied with respectively different drive signals in response to a handshake sensed by a gyro sensor. Thereby the four of the second coil blocks (230) may prevent the handshake.

According to an exemplary embodiment of the present disclosure, the handshake compensation function by the second magnet (130) and the second coil block (230) may be performed after the auto-focusing operation by the first magnet (120) and the first coil block (110) is completed.

Otherwise, the handshake compensation function by the second magnet (130) and the second coil block (230) may be performed while the auto-focusing operation by the first magnet (120) and the first coil block (110) is being performed.

Meanwhile, terminal pins (240), which apply a drive signal applied from outside to the first coil block (220) and the second coil block (230), may be respectively arranged at positions responding to both end portions of the first coil block (220) and both end portions of the second coil block (230). The terminal pin (240) may be inserted in the housing (210).

Each of the first coil block (220) or the second coil block (230) may be formed as a wound coil. Otherwise, each of the first coil block (220) or the second coil block (230) may be formed as a single coil using FPCB (flexible printed circuit board). Here, the first coil block (220) may be an auto-focus coil block, and the second coil block (230) may be a handshake compensation coil block.

The terminal pin (240) may be manufactured in a shape of thin metal plate. A plating layer may be formed on the terminal pin (240), in order to improve electrical connection characteristic of the terminal pin (240).

Although an exemplary embodiment where the first coil block (220) and the second coil block (230) may be formed on an outer side surface or an outer side surface of the side wall (214) of the housing (210) is being illustrated and described, otherwise, a though-hole may be formed on the housing (210) responding to the first magnet (120).

The base (300) may be formed in a rectangular parallelopipedon. An opening (305) may be formed on a center portion of the base (300). A coupling pillar (310) to be coupled to the housing (200) may be upwardly protruded on the base (300).

The coupling pillar (310) of the base (300) and the coupling groove formed on the housing responding to the coupling pillar (310) may be coupled to each other by way of mutual fitting.

An IR filter and an image sensor module may be installed on a rear surface of the base (300).

A shock absorption member (250) may be arranged on an upper surface of the base (300). The shock absorption member (250) may prevent shock from acting on the operator (100) and the elastic member (250) (to be described hereinafter), when the bobbin (110) of the operator (100) contacts with the base (300).

The shock absorption member (250) may be made of, for example, elastic rubber material, or elastic synthetic resin material.

The case (400) may cover the stator (200) covering the operator (100). The case (400) may prevent the electromagnetic wave generated from the first coil block (220) and the handshake compensation coil block (230) of the stator (200) (or the electromagnetic wave from outside) from being applied to the first coil block (220) and the handshake compensation coil block (230).

The case (400) may be formed by press-processing a metal plate, in order to block foreign matters from outside, as well as in order to block the electromagnetic wave.

The case (400) may include an upper plate (410) and a side plate (420). The upper plate (410) and the side plate (420) may be integrally formed.

The upper plate (410) may be formed in a shape of rectangular plate when viewed from a flat side. An opening for exposing the lens fixed to the bobbin (110) of the operator (100) may be formed on a center portion of the upper plate (410).

The side plate (420) may extend along an outer side surface of the side wall (214) of the housing (210) of the stator (200) from an edge of the upper plate (410). The side plate (420) may be fixed to the base (300).

The elastic member (250) may elastically support the operator (100) by being coupled to an upper end of the operator (100). The elastic member (250) may elastically support the operator (100) so that the operator (100) can float above the base (300) when a drive signal is not applied to the operator (100) and/or the stator (200).

Such elastic member (250) may be formed as a plurality of springs or wires connected to an inner side surface of the case (400) and the bobbin (110). As illustrated in the drawings, the elastic member (250) may be formed by press-processing in a shape of leaf spring.

The elastic member (250) may locate the operator (100) as floating above the upper surface of the base (300), thereby the operator (100) may perform the auto-focusing operation or the handshake compensation operation while being bi-directionally driven with respect to the base (300).

The elastic member (250) may include an upper elastic member (260) and a lower elastic member (270).

The upper elastic member (260) may include an inner elastic member (262), an outer elastic member (264) and a connection elastic member (266).

The inner elastic member (262) may be coupled to the coupling protrusion (112) formed on an upper end of the bobbin (110). The inner elastic member (262) may be formed, for example, in a shape of annular ring.

The outer elastic member (264) may be arranged at an external side of the inner elastic member (262). The outer elastic member (264) may be formed, for example, in a shape of rectangular band. The outer elastic member (264) may be arranged at an upper surface of the housing (210).

The connection elastic member (266) may apply elasticity to the inner elastic member (262) by connecting the inner elastic member (262) and the outer elastic member (264).

The connection elastic member (266) may be formed in a shape of long band generating elasticity by bending in a zigzag shape. The connection elastic member (266) may be formed in a symmetrical shape with the inner elastic member (262) as a standard point. Otherwise, the connection elastic member (266) may be formed in an asymmetrical shape with the inner elastic member (262) as a standard point.

Meanwhile, the lower elastic member (270) may be formed in a shape similar to the upper elastic member (260). The lower elastic member (270) may elastically support the bobbin (110) by being coupled to a lower surface of the bobbin (110).

According to an exemplary embodiment of the present disclosure, each of the connection elastic members (266) of the elastic member (250) may have a same elastic modulus. Otherwise, each of the connection elastic members (266) of the elastic member (250) may have a different elastic modulus from one another.

As described in the above with details, the auto-focusing operation and the handshake compensation operation may be performed independently, or the handshake compensation operation may be performed during the auto-focusing operation, by forming magnets for auto-focusing and magnets for handshake compensation alternately at the outer circumferential surface of the bobbin, and by arranging coil blocks at positions responding to the magnets for auto-focusing and the magnets for handshake compensation at the housing of the stator facing the bobbin.

Although descriptions and exemplary embodiments of an actuator are described herein, a camera module may also be formed by combining a lens with the actuator, and by including an image sensor and a printed circuit board. Here, the lens may convert an optical signal incident through the lens to an electrical signal. The printed circuit board may apply electrical power to the actuator. The image sensor may be mounted on the printed circuit board.

In addition, it is obvious that a mobile device (such as mobile phone) including the camera module may be manufactured.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments within an equivalent scope. Therefore, the technical scope of the rights for the present disclosure shall be decided by the claims.

What is claimed is:

1. A lens driving actuator comprising:
   a housing;
   a bobbin disposed inside the housing and comprising first to third lateral surfaces, first corner surface disposed between the first lateral surface and the second lateral surface and second corner surface disposed between the second lateral surface and the third lateral surface;
   a first magnet disposed on the first lateral surface of the bobbin;
   a second magnet disposed on the first corner surface of the bobbin;
   a third magnet disposed on the second corner surface of the bobbin;
   a first coil disposed on the housing and facing the first magnet;
   a second coil disposed on the housing and facing the second magnet; and
   a third coil disposed on the housing and facing the third magnet,
   wherein an outer surface of the second magnet facing the second coil and an outer surface of the third magnet facing the third coil are formed as a plane surface, and
   wherein an imaginary plane surface extended from the outer surface of the second magnet is perpendicular to an imaginary plane surface extended from the outer surface of the third magnet.

2. The lens driving actuator of claim 1, wherein the bobbin is moved along an optical axis when power is supplied to the first coil.

3. The lens driving actuator of claim 2, wherein the bobbin is moved in a first direction perpendicular to the optical axis when power is supplied to the second coil, and
   wherein the bobbin is moved in a second direction perpendicular to the optical axis and the first direction when power is supplied to the third coil.

4. The lens driving actuator of claim 2, wherein the bobbin is titled in a first direction perpendicular to the optical axis when power is supplied to the second coil, and
   wherein the bobbin is titled in a second direction different from the first direction when power is supplied to the third coil.

5. The lens driving actuator of claim 1, wherein a length of a long side of an outer surface of the first magnet is longer than a length of a long side of the outer surface of the second magnet.

6. The lens driving actuator of claim 1, wherein an obtuse angle is formed by an imaginary plane surface extended from an outer surface of the first magnet and the imaginary plane surface extended from the outer surface of the second magnet.

7. The lens driving actuator of claim 1, wherein each of the first magnet, the second magnet and the third magnet is formed as a flat magnet.

8. The lens driving actuator of claim 5, wherein the first coil has a flat shape to be parallel with the outer surface of the first magnet and the second coil has a flat shape to be parallel with the outer surface of the second magnet, and
   wherein a width of the first coil is larger than a width of the second coil.

9. The lens driving actuator of claim 1, wherein first magnet is formed as four first magnets disposed by a same interval at an outer circumferential surface of the bobbin.

10. The lens driving actuator of claim 1, further comprising a base disposed below the housing, and
    wherein a bottom surface of the bobbin is spaced from an upper surface of the base when drive current is not applied to the first coil.

11. The lens driving actuator of claim 10, wherein a shock absorption member is arranged at the upper surface of the base facing the bobbin.

12. The lens driving actuator of claim 1, wherein a plurality of terminal pins coupled with the first coil, the second coil and the third coil are disposed on the housing, and
    wherein bottom ends of the terminal pins are disposed lower than a bottom surface of the housing.

13. The lens driving actuator of claim 1, wherein the elastic member includes an outer elastic member coupled to the housing, and an inner elastic member coupled to the bobbin, and a connection elastic member for connecting the outer and the inner elastic members.

14. The lens driving actuator of claim 13, wherein a plurality of the connection elastic members are coupled by a same interval to the outer elastic member and the inner elastic member, and an elastic modulus of each of the connection elastic members is a same.

15. The lens driving actuator of claim 13, wherein a plurality of the connection elastic members are coupled by a same interval to the outer elastic member and the inner elastic member, and the connection elastic members are formed in an asymmetrical shape.

16. The lens driving actuator of claim 1, wherein the first coil is formed in a first size, and the second coil is formed in a second size smaller than the first size.

17. A camera module comprising:
   a printed circuit board coupled with an image sensor;
   a housing disposed over the printed circuit board;
   a bobbin disposed inside the housing and coupled with at least one lens disposed over the image sensor, wherein the bobbin comprises first to third lateral surfaces, first corner surface disposed between the first lateral surface and the second lateral surface and second corner surface disposed between the second lateral surface and the third lateral surface;
   a first magnet disposed on the first lateral surface of the bobbin;
   a second magnet disposed on the first corner surface of the bobbin;
   a third magnet disposed on the second corner surface of the bobbin;
   a first coil disposed on the housing and facing the first magnet;
   a second coil disposed on the housing and facing the second magnet; and
   a third coil disposed on the housing and facing the third magnet,
   wherein an outer surface of the second magnet facing the second coil and an outer surface of the third magnet facing the third coil are fainted as a plane surface, and
   wherein an imaginary plane surface extended from an outer surface of the second magnet is perpendicular to an imaginary plane surface extended from an outer surface of the third magnet.

18. A mobile phone having a camera module, the camera module comprising:
   a printed circuit board coupled with an image sensor;
   a housing disposed over the printed circuit board;
   a bobbin disposed inside the housing and coupled with at least one lens disposed over the image sensor, wherein the bobbin comprises first to third lateral surfaces, first corner surface disposed between the first lateral surface and the second lateral surface and second corner surface disposed between the second lateral surface and the third lateral surface;
   a first magnet disposed on the first lateral surface of the bobbin;
   a second magnet disposed on the first corner surface of the bobbin;
   a third magnet disposed on the second corner surface of the bobbin;
   a first coil disposed on the housing and facing the first magnet;
   a second coil disposed on the housing and facing the second magnet; and
   a third coil disposed on the housing and facing the third magnet,
   wherein an outer surface of the second magnet facing the second coil and an outer surface of the third magnet facing the third coil are formed as a plane surface, and
   wherein an imaginary plane surface extended from an outer surface of the second magnet is perpendicular to an imaginary plane surface extended from an outer surface of the third magnet.

* * * * *